(12) United States Patent
Ackerman et al.

(10) Patent No.: US 10,981,336 B2
(45) Date of Patent: Apr. 20, 2021

(54) COMPOSITE STRUCTURES HAVING BONDLINES WITH MATCHED ELECTRICAL CONDUCTIVITY

(71) Applicant: The Boeing Company, Chicago, IL (US)

(72) Inventors: Patrice K. Ackerman, Kent, WA (US); Diane L. Heidlebaugh, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/914,128

(22) Filed: Mar. 7, 2018

(65) Prior Publication Data

US 2018/0194073 A1    Jul. 12, 2018

Related U.S. Application Data

(63) Continuation of application No. 13/663,543, filed on Oct. 30, 2012, now abandoned.

(51) Int. Cl.
*B29C 65/48*    (2006.01)
*B64F 5/40*    (2017.01)
(Continued)

(52) U.S. Cl.
CPC ...... *B29C 65/4855* (2013.01); *B29C 65/5021* (2013.01); *B29C 65/5028* (2013.01); *B29C 65/5057* (2013.01); *B29C 66/112* (2013.01); *B29C 66/114* (2013.01); *B29C 66/1122* (2013.01); *B29C 66/43* (2013.01); *B29C 66/43441* (2013.01); *B29C 66/7212* (2013.01); *B29C 66/73141* (2013.01); *B64D 37/02* (2013.01); *B64D 45/02* (2013.01); *B64F 5/40* (2017.01); *B29C 66/72141* (2013.01); *B29C 66/72143* (2013.01); *B29L 2031/3076* (2013.01); *B29L 2031/7172* (2013.01); 
(Continued)

(58) Field of Classification Search
USPC ......................................................... 220/562
See application file for complete search history.

(56) References Cited

U.S. PATENT DOCUMENTS 4,428,867 A    1/1984  Billias et al.
4,448,838 A    5/1984  McClenahan et al.
(Continued)

FOREIGN PATENT DOCUMENTS

JP    S61083344 A    4/1986
JP    2001510422 A    7/2001
(Continued)

OTHER PUBLICATIONS

The Korean Intellectual Property Office, Notice of Office Action and English translation, dated Apr. 2, 2018, regarding Application No. 10-2015-7007320, 13 pages.
(Continued)

*Primary Examiner* — Lynda Salvatore
(74) *Attorney, Agent, or Firm* — Yee & Associates, P.C.

(57) ABSTRACT

Two composite laminates are joined together by a bondline having portions exposed to the ambient environment. The bondline contains scrim having an electrical conductivity and impedance matched to that of the laminates in order to mitigate effects of lightning strikes.

20 Claims, 6 Drawing Sheets

(51) Int. Cl.
| | |
|---|---|
| *B64D 37/02* | (2006.01) |
| *B64D 45/02* | (2006.01) |
| *B29C 65/50* | (2006.01) |
| *B29C 65/00* | (2006.01) |
| *B29L 31/30* | (2006.01) |
| *B29L 31/00* | (2006.01) |

(52) U.S. Cl.
CPC .......... *Y02T 50/40* (2013.01); *Y10T 29/49826* (2015.01); *Y10T 156/10* (2015.01); *Y10T 403/47* (2015.01); *Y10T 428/1352* (2015.01); *Y10T 428/24942* (2015.01)

(56) References Cited

U.S. PATENT DOCUMENTS

| | | | |
|---|---|---|---|
| 4,556,591 | A | 12/1985 | Bannink, Jr. |
| 4,839,771 | A | 6/1989 | Covey |
| 5,160,771 | A | 11/1992 | Lambing et al. |
| 3,320,118 | A1 | 11/2001 | Pridham et al. |
| 6,320,118 | B1 * | 11/2001 | Pridham ............. B29C 65/4855 174/2 |
| 7,223,312 | B2 | 5/2007 | Vargo et al. |
| 7,277,266 | B1 | 10/2007 | Le et al. |
| 7,628,879 | B2 | 12/2009 | Ackerman |
| 2009/0053406 | A1 * | 2/2009 | Ackerman ............. B29C 73/10 427/142 |
| 2014/0117022 | A1 | 5/2014 | Ackerman et al. |

FOREIGN PATENT DOCUMENTS

| | | |
|---|---|---|
| JP | 2008530270 A | 8/2008 |
| JP | 2010536622 A | 12/2010 |
| JP | 2011051517 A | 3/2011 |
| JP | 2012162148 A | 8/2012 |
| WO | WO2012050338 A | 4/2012 |

OTHER PUBLICATIONS

Extended European Search Report, dated Jul. 12, 2018, regarding Application No. EP18162993.2, 6 pages.
Japanese Patent Office Notice of Reasons for Rejection with English Translation, dated Feb. 26, 2019, regarding Application No. JP2018-041512, 5 pages.
International Search Report and Written Opinion, dated May 13, 2014, regarding Application No. PCT/US2013/059329, 10 pages.
Canadian Intellectual Property Office Examination Search Report, dated Dec. 12, 2016, regarding Application No. 2,683,719, 4 pages.
Notice of Reasons and Rejection and English Translation, dated Jun. 13, 2017, regarding Japanese Patent Application No. 2015-539599, 6 pages.
Brazilian Office Action and English translation, dated Mar. 17, 2020, regarding Application No. BR112015006821-9, 6 pages.

* cited by examiner

COMPOSITE STRUCTURES HAVING BONDLINES WITH MATCHED ELECTRICAL CONDUCTIVITY

CROSS REFERENCE TO RELATED APPLICATIONS

This application is a continuation of and claims the benefit of U.S. patent application Ser. No. 13/663,543, filed Oct. 30, 2012, status abandoned, the entire disclosure of which is incorporated by reference herein.

BACKGROUND INFORMATION

1. Field

This disclosure generally relates to techniques for bonding composite structures, and deals more particularly with methods for mitigating the effects of lightning strikes at bondlines.

2. Background

Fiber reinforced composite structures, such as, without limitation, carbon fiber reinforced plastics (CFRP) may be bonded together along a bondline using a structural adhesive. The bondline may be strengthened and reinforced by introducing one more layers of scrim into the adhesive.

In aircraft applications, areas of composite structures such as fuselage skins are sometimes repaired or reworked by adhesively bonding composite repair patches to the structure. In order to reduce the effects of lightning strikes on the repair patch, it is necessary to provide a continuous electrical path between the repair patch and the structure to which it is bonded in order to dissipate electrical current flow.

In order to provide electrical continuity between a composite repair patch and the composite structure to which it is bonded, an electrically conductive scrim may be placed in the bondline. A problem arises, however, when portions of the bondline are exposed to the ambient environment. A lightning, strike may generate an undesirable electrical potential across the bondline. In order to avoid the effects of an undesirable electrical potential across the bondline, the exposed areas of the bondline are covered with an electrically insulating sealant. Although sealants are effective, they increase the weight of the aircraft, and are both time-consuming and labor-intensive, adding to manufacturing costs.

Accordingly, there is a need for a method of joining composite structures along bondlines that mitigate the effects of lightning strikes, and reduce accompanying electrical potentials occurring across exposed bondlines. There is also a need for a method of bonding composite structures together which obviates the need for sealants to cover exposed portions of bondlines between the structures.

SUMMARY

The disclosed methods provide composite structures joined together along bondlines that have electrical conductivities which are matched to the structures which they join. The use of bondlines having conductivities matched to those of the structures reduces an electrical potential across exposed portions of the bondline. The use of sealants to cover exposed portions of bondlines may be reduced or eliminated, thereby reducing aircraft weight and manufacturing costs.

According to one disclosed embodiment, a composite laminate structure is provided comprising first and second fiber reinforced plastic resin laminates each having an electrical impedance, and a structural bondline joining the first and second laminates together. The bondline has an electrical impedance substantially matching the electrical impedance of the first and second laminates. The fiber reinforcement in each of the first and second fiber reinforced plastic resin laminates are carbon fibers, and the bondline includes an adhesively impregnated scrim having an electrical impedance that substantially matches the electrical impedance of the first and second laminates. At least a portion or the bondline is exposed to an ambient environment. The first and second laminates and the bondline may form a T-joint. The first and second laminates may form part of a fuel tank having an open interior, and in which a portion of the bondline is exposed to the open interior of the fuel tank. The bondline includes an adhesively impregnated scrim having an AC (alternating current) conductivity that substantially matches the AC conductivity of the first and second laminates.

According to another embodiment, a composite laminate structure is provided comprising a first carbon fiber reinforced plastic laminate having a first electrical impedance, and a second carbon fiber reinforced plastic laminate having a second electrical impedance substantially matching the first electrical impedance. The laminate structure further includes an adhesive bondline between the first and second laminates. The adhesive bond includes an adhesive and a scrim having a third electrical impedance substantially matching the first and second electrical impedances. The first and second laminates may form part of a fuel tank having an open interior adapted to store fuel, wherein a portion of the adhesive bondline is exposed to the open interior of the fuel tank. The first and second laminates and the adhesive bondline may form a T-joint. Each of the first, second and third electrical impedances include a resistive component and a reactive component. The resistive components are substantially equal, and the reactive components are substantially equal. The scrim may be formed of carbon fibers. The first and second laminates and the bondline have substantially the same AC conductivity.

According to still another embodiment, a composite aircraft fuel tank is provided with lightning protection. The lighting protection comprises at least a first carbon fiber reinforced plastic laminate wall, at least a second carbon fiber reinforced plastic laminate wall, and an adhesive bondline joining the first and second laminate walls, the adhesive bondline including electrically conductive scrim having an electrical impedance substantially matching the electrical impedance of each of the first and second laminate walls. At least a portion of the adhesive bondline is adapted to be exposed to fuel vapors within the fuel tank.

According to still another embodiment, a method of providing lightning protection for a bond joint between two cured carbon fiber reinforced plastic laminates comprises installing scrim in the bond joint having an electrical impedance that substantially matches the electrical impedance each of the two carbon fiber reinforced plastic laminates. Installing the scrim includes impregnating the scrim with an adhesive. The adhesive may be one of a film adhesive and a paste adhesive. The scrim may be formed of carbon fibers. The laminates and the scrim may possess substantially the same electrical conductivity. Installing the scrim in the bond joint includes assembling the two laminates in a T-shaped configuration, and placing the scrim between an edge of one of the two laminates, and a face of the other of the two laminates.

According to a further embodiment, a method is provided of reducing the electrical potential across an exposed bondline between two, carbon fiber reinforced plastic laminates. The method comprises determining the electrical conductivity of each of the two laminates, selecting a scrim having an electrical conductivity substantially matching the determined electrical conductivity of each of the two laminates, installing the scrim and an adhesive between the two laminates, and curing the adhesive.

According to still further embodiment, a method is provided of fabricating a composite structure having an exposed bond protected against lightning strikes. The method comprises laying up first and second carbon fiber reinforced plastic pre-preg laminates, curing the first and second pre-preg laminates, and joining the first and second cured laminates with a bond joint. Joining the first and second cured laminates with the bond joint may include selecting a scrim having an electrical impedance substantially matching the electrical impedance of each of the first and second laminates, impregnating the scrim with a bonding adhesive, installing the impregnated scrim between the first and second laminates to form a bondline, and curing the adhesive.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
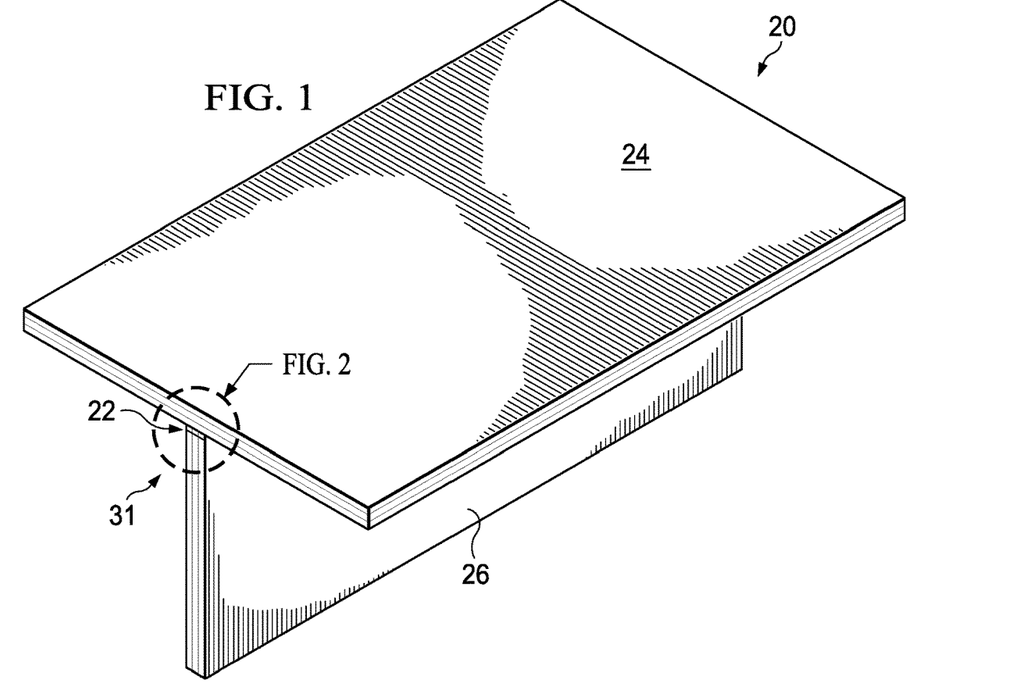
FIG. 1 is an illustration of a perspective view of a bonded composite structure having a bondline employing electrically conductive scrim according to the disclosed embodiments.
Figure 2:
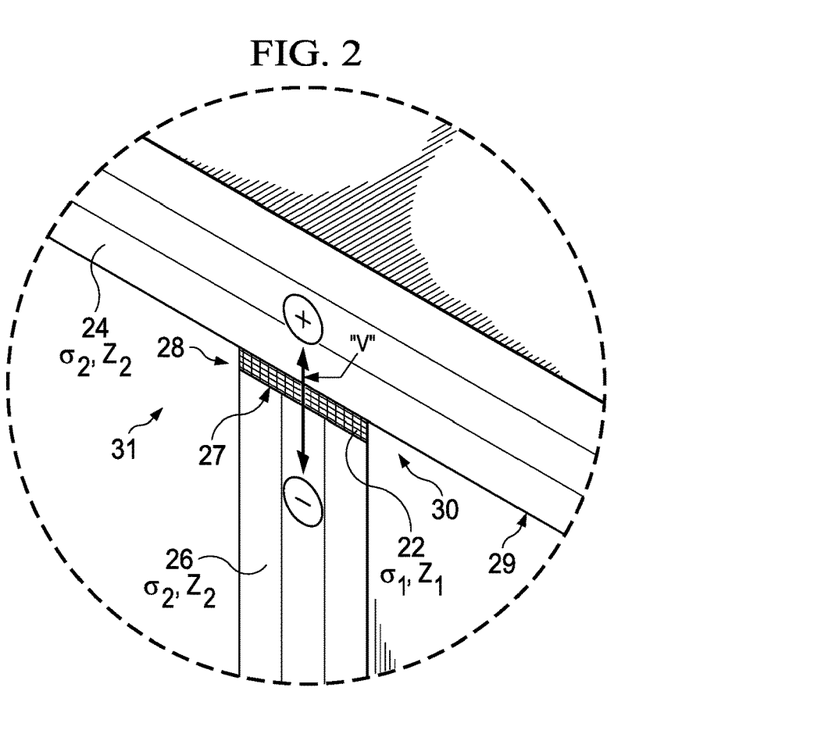
FIG. 2 is an illustration of an end view of the area designated as FIG. 2 in FIG. 1.

Referring first to FIGS. 1 and 2, a composite structure 20 comprises first and second composite pre-pregs 24, 26, which may be formed of by laying up pre-preg plies, such as a CFRP. In this example, the first and second pre-pregs 24, 26 together are joined together along a bondline 22 between a face 29 of the first pre-preg 24 and an edge of the second pre-preg 26, effectively forming a butt joint 31. The bondline 22 includes exposed portions 28, 30 at the ends of the bondline 22, which are exposed to the surrounding ambient environment. As will be discussed below, the bondline 22 has an electrical conductivity $\sigma_1$ and impedance $Z_1$ that substantially match the electrical conductivity $\sigma_2$ and impedance $Z_2$ of each of the first and second pre-pregs 24, 26. This matching of the electrical conductivities $\sigma_1$, $\sigma_2$ and impedances $Z_1$, $Z_2$ reduces eliminates build-up of an undesirable electrical potential or charge "V" (FIG. 2) between the pre-pregs 24, 26 along the exposed portions 28, 30 of the bondline 22.

The disclosed bondline 22 may be employed to form other types of bonded joints between two laminate structures. For example, referring to FIG. 3, the disclosed bondline 22 may be employed to form a lap joint 35 between first and second composite pre-pregs 24, 26. In this example, the bondline 22 also has exposed portions 28, 30 which need not be sealed as a result of the electrical conductivity $\sigma_1$ and impedance $Z_1$ of the bondline 22 being matched to the electrical conductivity $\sigma_2$ and impedance $Z_2$ of the first and second pre-pregs 24, 26.

Figure 4:
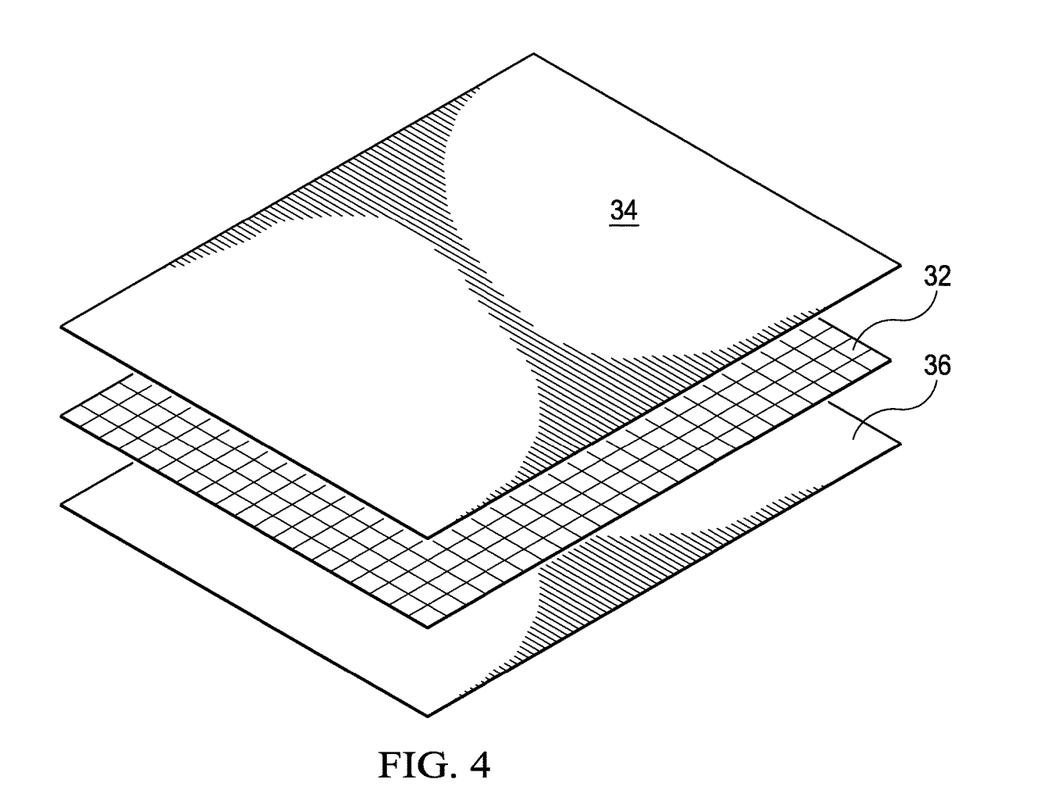
FIG. 4 is an illustration of a perspective view of the scrim along with two layers of adhesive used to form the bondline.

Attention is now directed to FIG. 4 which illustrates the components used to form the bondline 22. A scrim 32 is sandwiched between two layers 34, 36 of a suitable structural adhesive. The scrim 32 may be in any of the numerous configurations such as, without limitation, a mesh, knitted mat or random fiber mat comprising intersecting strands of electrically conductive fibers. The conductive fibers have an AC conductivity $\sigma_1$ and an impedance $Z_1$ respectively matching the AC conductivity $\sigma_2$ and impedance $Z_2$ of the first and second pre-pregs 24, 26. The fibers may comprise a single material, or may comprise fibers of multiple types of materials which collectively have the required conductivity $\sigma_1$ and impedance $Z_1$ matched to the AC conductivity $\sigma_2$ and impedance $Z_2$ of the pre-pregs 24, 26. In the case of first and second pre-pregs 24, 26 comprising CFRPs, then the fibers of the scrim 32 may also be formed of carbon fibers similar or identical to those forming the carbon fiber reinforcement in the first and second pre-pregs 24, 26. While only a single layer of scrim 32 is illustrated in FIG. 4, multiple layers of the scrim 32 may be employed in a single bondline 22.

Each of the adhesive layers 34, 36 may comprise an adhesive resin film or an adhesive resin paste which adheres to the CFRP plies of the pre-pregs 24, 26. The scrim 32 may be embedded into and adhere to each of the adhesive layers 34, 36, as by pressing the scrim 32 into the adhesive layers 34, 36. Other techniques for integrating bonding adhesive with the scrim 32 may be possible, including impregnating the scrim 32 with the adhesive. The scrim 32 is configured to provide continuous electrical conductivity throughout the bondline 22 and may also serve as a binding matrix.

Figure 3:
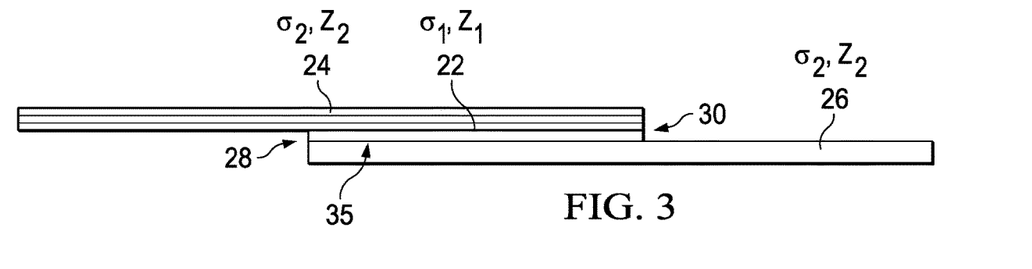
FIG. 3 is an illustration of a cross-sectional view of two laminate structures joined together by a lap joint employing the disclosed scrim.
Figure 5:
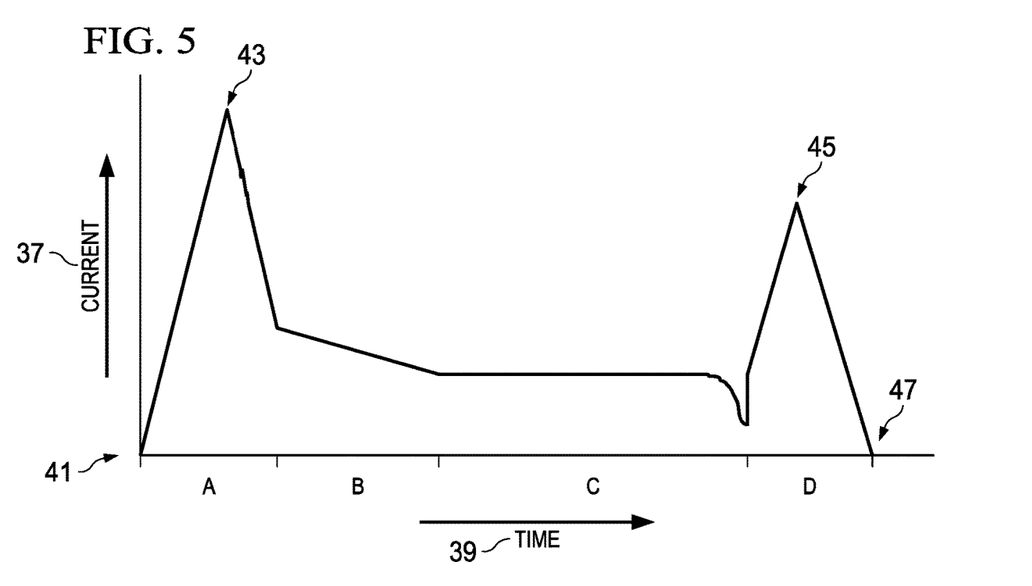
FIG. 5 is an illustration of a graph showing electrical current flow resulting from a typical lightning strike.

As previously mentioned, the scrim 32 possesses an AC conductivity $\sigma_1$ and an impedance $Z_1$ that substantially match the electrical conductivity $\sigma_2$ and impedance $Z_2$ of each of the composite pre-pregs joined by the bondline 22. Electrical conductivity $\sigma$ is a measure of the material's ability to conduct electric current. In the case of a lightning strike causing electrical current to flow through the pre-pregs 24, 26, and through the bondline 22, the current flow is typically not constant, but varies, similar to an alternating current (AC). For example, FIG. 5 is a graph showing electrical current flow 37 over time 39, produced by a typical lightning strike. During an initial time period "A", the current flow begins with a sharp spike 43 at the initial lightning attachment 41, then decays slowly during time period "B", may be somewhat constant during time period. "C", and then quickly increases during time period "D", forming another sharp spike 45 immediately before detachment at 47. Accordingly, the pre-pregs 24, 26, and the scrim 32 each have respective AC conductivities $\sigma_1$, $\sigma_2$ and respective impedances $Z_1$, $Z_2$ (FIGS. 2 and 3).

Figure 6:
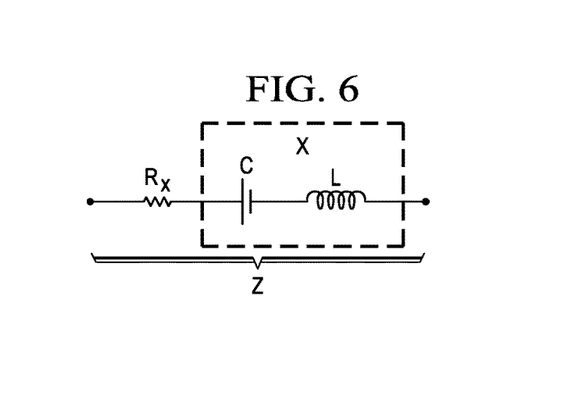
FIG. 6 is an illustration of a circuit diagram of an impedance.

FIG. 6 is a circuit diagram representing the components of each of the impedances $Z_1$, $Z_2$. The impedance Z is the sum of a resistive component $R_X$ and a reactive component X, thus, $Z=R_X+X$. The reactive component X, or "reactance", includes inductance L and capacitance C, and represents the opposition of the scrim 32, viewed as a circuit, to a change of electric current or voltage caused by the lightning strike. Because the AC conductivity $\sigma_1$ and the impedance $Z_1$ of the scrim 32, and thus of the bondline 22, are respectively matched to those of the first and second pre-pregs 24, 26, the current flow through the pre-pregs 24, 26 passes unimpeded through the bondline 22, rather "seeing" a discontinuity in the bondline 22 which may results in the build-up of an undesirable electrical potential or charge "V" (FIG. 2) across the bondline 22 in the area of the exposed portions 28, 30.

Figure 7:
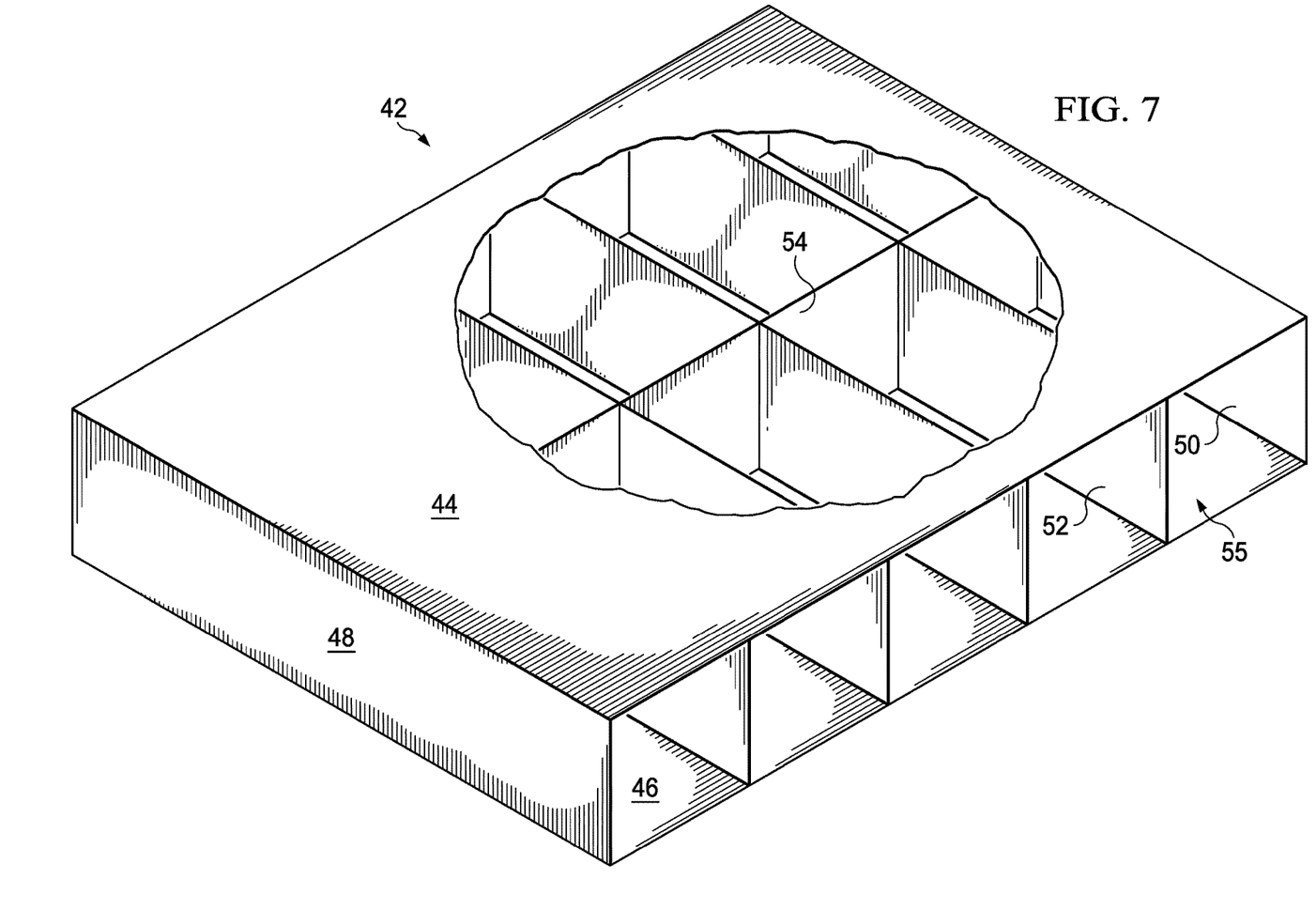
FIG. 7 is an illustration of a perspective view of an aircraft fuel tank, portions broken away to reveal the interior of the tank.

The bondline 22 described above having a "matched" electrical conductivity $\sigma_1$ and a "matched" impedance $Z_1$ may be used in a wide variety of composite laminate structures to mitigate the effects electrical current flows due to lightning strikes. For example, the disclosed bondline 22 may be employed in a composite aircraft fuel tank 42 shown in FIG. 7. The fuel tank 42 includes a composite laminate top 44, bottom 46 and sides 48, 50 forming an internal volume 55. The fuel tank 42 may further include internal ribs 52 as well as a baffle walls 54, each of which are bonded along its top and bottom edges to the top and bottom walls 44, 46 respectively, by a T-joint and bondline 22 similar to that shown in FIGS. 1 and 2 which use the scrim 32 shown in FIG. 4. The disclosed bondline 22 may also be employed to bond the repair patches (not shown) to underlying composite structures, such as CFRP laminate skins.

Figure 8:
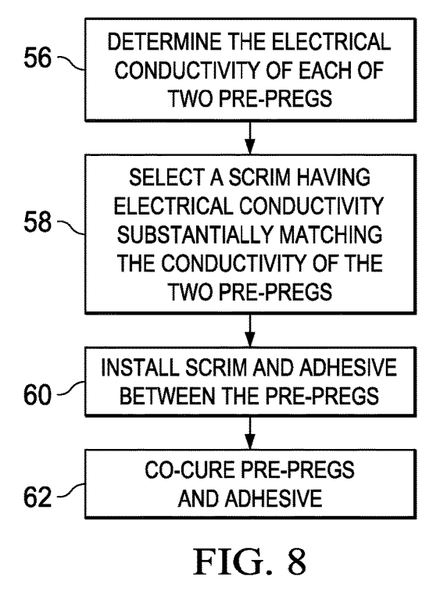
FIG. 8 is an illustration of a flow diagram of a method of co-curing two composite pre-pregs along a bondline.

Attention is now directed to FIG. 8 which illustrates the overall steps of a method of reducing the buildup of an electrical potential or charge across a bond line 22 in the area of exposed portions 28, 30 of the bondline 22 between two pre-pregs 24, 26 subjected to the effects of lightning strikes. At step 56, the electrical conductivities $\sigma_2$ of each of the two pre-pregs 24, 26 are determined. Next at 58, scrim used in the bondline 22 is selected which has an electrical conductivity $\sigma_1$ substantially matching the electrical conductivity $\sigma_2$ of each of the two pre-pregs 24, 26. At step 60, the scrim 32 along with the adhesive is installed between the pre-pregs 24, 26, following which the pre-pregs 24, 26 and the pre-pregs and the adhesive are co-cured at step 62.

Figure 9:
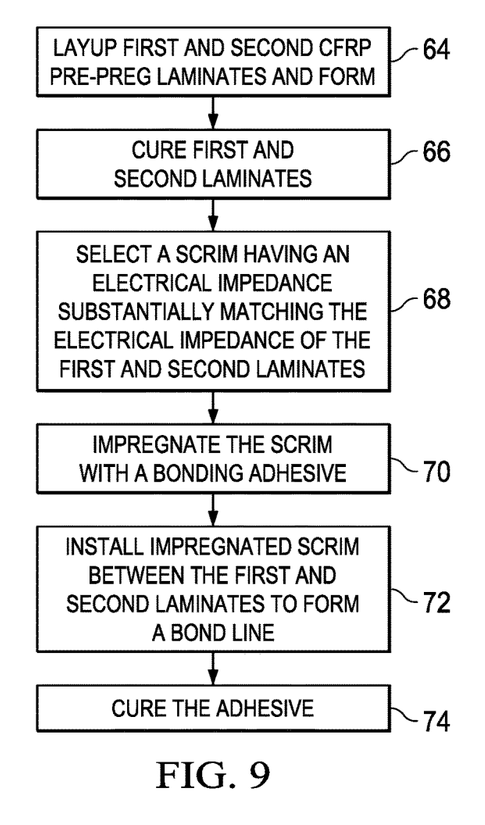
FIG. 9 is an illustration of a flow diagram of a method of fabricating a bonded precured structure employing the disclosed scrim.

FIG. 9 broadly illustrates the steps of a method or fabricating a CFRP laminate structure 20 having bondlines 22 provided with lightning protection. At step 64, first and second CFRP pre-pregs 24, 26 are laid up, and formed to shape, as required. At step 66, each of the first and second CFRP pre-pregs 24, are cured to form laminates. At step 68 a scrim 32 is selected having an electrical impedance $Z_1$ substantially matching the electrical impedance $Z_2$ of the first and second pre-preg laminates 24, 26. At step 70, the scrim 32 is impregnated or otherwise integrated into a suitable bonding adhesive. At step 72, the impregnated scrim is installed between surfaces of the first and second pre-preg laminates 24, 26 to form a bondline 22 which may include exposed portions 78, 30. Finally, at 74, the adhesive is cured.

Figure 10:
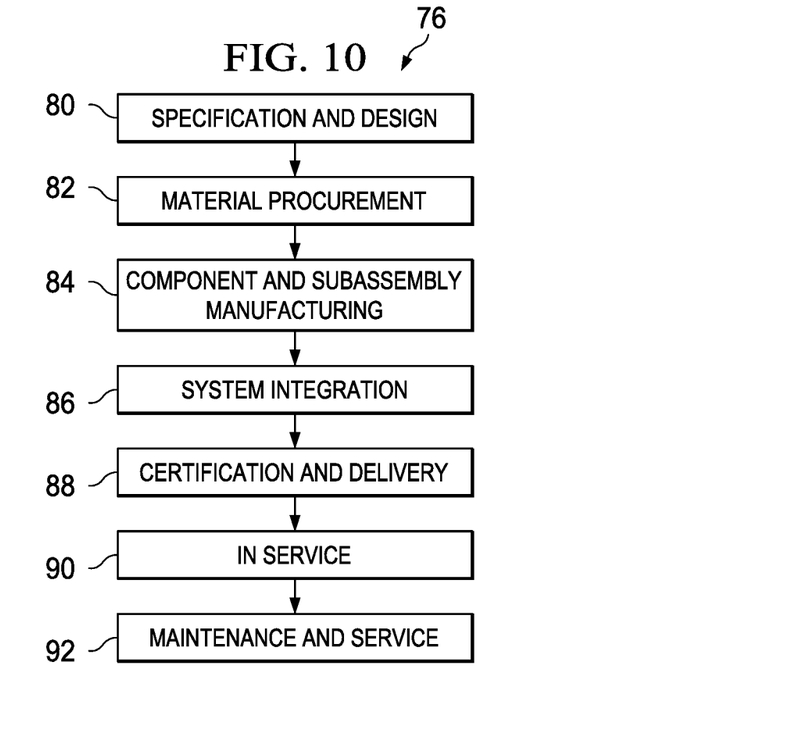
FIG. 10 is an illustration of a flow diagram of aircraft production and service methodology.
Figure 11:
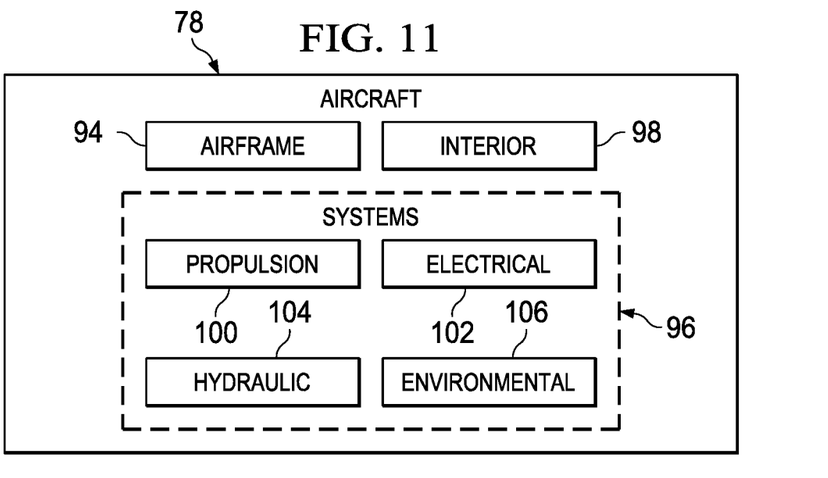
FIG. 11 an illustration of block diagram of an aircraft.

Embodiments of the disclosure may find use in a variety of potential applications, particularly in the transportation industry, including for example, aerospace, marine, automotive applications and other application where autoclave curing of composite parts may be used. Thus, referring now to FIGS. 10 and 11, embodiments of the disclosure may be used in the context of an aircraft manufacturing and service method 76 as shown in FIG. 10 and an aircraft 78 as shown in FIG. 11. Aircraft applications of the disclosed embodiments may include, for example, without limitation, fabrication of composite laminate assemblies and subassemblies requiring bonded joints that require protection against the effects of lightning strikes on an aircraft. During pre-production, exemplary method 76 may include specification and design 80 of the aircraft 78 and material procurement 82. During production, component and subassembly manufacturing 84 and system integration 86 of the aircraft 78 takes place. Thereafter, the aircraft 78 may go through certification and delivery 88 in order to be placed in service 90. While in service by a customer, the aircraft 78 is scheduled for routine maintenance and service 92, which may also include modification, reconfiguration, refurbishment, and so on.

Each of the processes of method 76 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 78 produced by exemplary method 76 may include an airframe 94 with a plurality of systems 96 and an interior 98. Examples of high-level systems 96 include one or more of a propulsion system 100, an electrical system 102, a hydraulic system 104, and an environmental system 106. Any number of other systems may be included. Although an aerospace example is shown, the principles of the disclosure may be applied to other industries, such as the marine and automotive industries.

Systems and methods embodied herein may be employed during any one or more of the stages of the production and service method 76. For example, components or subassemblies corresponding to production process 84 may be fabricated or manufactured in a manner similar to components or subassemblies produced while the aircraft 96 is in service. Also, one or more apparatus embodiments, method embodiments, or a combination thereof may be utilized during the production stages 84 and 86, for example, by substantially expediting assembly of or reducing the cost of an aircraft 78. Similarly, one or more of apparatus embodiments, method embodiments, or a combination thereof may be utilized while the aircraft 78 is in service, for example and without limitation, to maintenance and service 92.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite laminate structure that comprises:
internal ribs and baffle walls that comprise a first fiber reinforced plastic resin laminate and a top that comprises a second fiber reinforced plastic resin laminate, such that the internal ribs and baffle walls comprise a first electrical impedance, and the top a second electrical impedance; and
a structural bondline co-cured to the internal ribs, the baffle walls, and the top, such that the structural bondline comprises a third electrical impedance substantially matching the first electrical impedance and the second electrical impedance configured to reduce an electrical potential across a portion of the structural bondline.

2. The composite laminate structure of claim 1, wherein:
fiber reinforcement in each of the first fiber reinforced plastic resin laminate and the second fiber reinforced plastic resin laminate comprises carbon fibers, and
the structural bondline includes an adhesively impregnated scrim having a fourth electrical impedance that substantially matches the first electrical impedance and the second electrical impedance.

3. The composite laminate structure of claim 1, wherein the structural bondline comprises a resin paste with an embedded scrim.

4. The composite laminate structure of claim 1, wherein the first fiber reinforced plastic resin laminate, the second fiber reinforced plastic resin laminate, and the structural bondline comprise a T-joint and the portion of the structural bondline comprises areas of the structural bondline not directly in contact with the top or the internal ribs and the baffle walls.

5. The composite laminate structure of claim 1, wherein the structural bondline includes an adhesively impregnated scrim having an AC conductivity that substantially matches an AC conductivity of the first fiber reinforced plastic resin laminate and the second fiber reinforced plastic resin laminate.

6. An aircraft fuel tank that comprises:
internal ribs joined to baffle walls that comprise a first fiber reinforced plastic resin laminate that comprises a first electrical impedance;
a top that comprises a second fiber reinforced plastic resin laminate that comprises a second electrical impedance; and
a structural bondline co-cured to the internal ribs joined to the baffle walls and the top, such that the structural bondline comprises:
an adhesively impregnated scrim configured to provide continuous electrical conductivity throughout the structural bondline;
a portion exposed to an interior of the aircraft fuel tank; and
a third electrical impedance that substantially matches the first electrical impedance and the second electrical impedance.

7. The aircraft fuel tank of claim 6, wherein:
the first fiber reinforced plastic resin laminate and the second fiber reinforced plastic resin laminate comprise carbon fiber, and
the adhesively impregnated scrim comprises a scrim within a resin paste that comprises a third electrical impedance that substantially matches a fourth electrical impedance of the second fiber reinforced plastic resin laminate.

8. The aircraft fuel tank of claim 6, wherein at least a portion of the structural bondline is exposed to an ambient environment.

9. The aircraft fuel tank of claim 6, wherein the first fiber reinforced plastic resin laminate, the second fiber reinforced plastic resin laminate, and the structural bondline comprise a T-joint.

10. The aircraft fuel tank of claim 6, wherein the structural bondline comprises a first AC conductivity that substantially matches a second AC conductivity of either the first fiber reinforced plastic resin laminate or the second fiber reinforced plastic resin laminate.

11. A composite laminate structure, that comprises a T-joint that comprises:
internal ribs joined to baffle walls that comprise a first fiber reinforced laminate and a top and a bottom that comprise a second fiber reinforced laminate, such that the first fiber reinforced laminate comprises a first electrical impedance, and the top and the bottom comprise a second electrical impedance; and
a structural bondline co-cured to the internal ribs joined to the baffle walls and the top, such that the structural bondline comprises a scrim and a third electrical impedance configured to:
reduce an electrical potential across the structural bondline at portions of the structural bondline exposed to an ambient environment; and
substantially match the first electrical impedance and the second electrical impedance.

12. The composite laminate structure of claim 11, wherein the scrim is adhesively impregnated.

13. The composite laminate structure of claim 11, wherein the first fiber reinforced laminate and the second fiber reinforced laminate comprises carbon fibers.

14. The composite laminate structure of claim 13, wherein the scrim has a fourth electrical impedance that substantially matches the first electrical impedance and the second electrical impedance.

15. The composite laminate structure of claim 14, wherein the first fiber reinforced laminate comprises a first plastic resin.

16. The composite laminate structure of claim 15, wherein the second fiber reinforced laminate comprises a second plastic resin.

17. The composite laminate structure of claim 16, wherein the first plastic resin and the second plastic resin comprise a same plastic resin.

18. The composite laminate structure of claim 17, wherein at least a portion of the structural bondline is exposed to an ambient environment.

19. The composite laminate structure of claim 18, wherein the T-joint is a component of an aircraft fuel tank.

20. The composite laminate structure of claim 19, wherein the aircraft fuel tank has an open interior, and the ambient environment comprises the open interior.

* * * * *